United States Patent [19]

Cooper et al.

[11] Patent Number: 4,667,143
[45] Date of Patent: May 19, 1987

[54] BATTERY CHARGER HAVING TEMPERATURE COMPENSATED CHARGE RATE

[75] Inventors: Craig L. Cooper, Bartlesville; Fred T. Klein, Tulsa, both of Okla.

[73] Assignee: Phillips Petroleum Company, Bartlesville, Okla.

[21] Appl. No.: 812,204

[22] Filed: Dec. 23, 1985

[51] Int. Cl.⁴ ............................................. H02J 7/04
[52] U.S. Cl. ...................................... 320/22; 320/32; 320/35
[58] Field of Search .................................. 320/22–24, 320/31, 32, 35, 36, 37, 38, 39, 40, 33; 363/56

[56] References Cited

U.S. PATENT DOCUMENTS

| | | | |
|---|---|---|---|
| 3,889,171 | 7/1975 | Hunter | 320/31 |
| 3,919,616 | 11/1975 | Allison | 320/35 |
| 3,944,904 | 3/1976 | Hase | 320/23 |
| 3,959,707 | 5/1976 | Stephens | 320/39 |
| 4,006,397 | 2/1977 | Catotti et al. | 320/31 |
| 4,061,956 | 12/1977 | Brown et al. | 320/22 |
| 4,146,830 | 3/1979 | Foster | 320/32 X |
| 4,233,553 | 11/1980 | Prince et al. | 320/32 X |
| 4,282,292 | 8/1981 | Stewart | 429/93 |
| 4,316,133 | 2/1982 | Locke, Jr. et al. | 320/48 |
| 4,433,277 | 2/1984 | Carollo et al. | 320/33 X |
| 4,584,514 | 4/1986 | Kaminski | 363/56 X |

Primary Examiner—R. J. Hickey
Attorney, Agent, or Firm—George E. Bogatie

[57] ABSTRACT

A battery charging circuit is disclosed which rapidly charges a battery from some level of discharge, including fully discharged, to fully charged without endangering the battery. The charging circuit includes a control circuit which provides switching type regulation responsive to current, voltage and temperature signals from the battery, and also a timer circuit for automatically halting the charging current to a defective battery. The control circuit receives a temperature compensated voltage signal (TCVS) which is useful for effectively implementing a charging program which includes a low constant current mode, a high constant current mode, and a constant voltage mode. The TCVS is generated by connecting a thermistor responsive to battery temperature in parallel with one resistor of a resistive voltage divider network which is connected across the battery terminals. The output of the thus modified voltage divider network when plotted against temperature is a nonlinear curve which, with proper selection of ohmic values for the resistors and thermistor, corresponds to a temperature/voltage relationship for the battery which is known from experimental results to be effective for charging the battery.

7 Claims, 6 Drawing Figures

BATTERY CHARGER HAVING TEMPERATURE COMPENSATED CHARGE RATE

Background of the Invention

This invention relates to battery chargers. In one aspect, it relates to temperature compensating the charging voltage applied to a battery. In another aspect it relates to rapidly charging a temperature sensitive battery without damage to the battery.

In many instances Nickel-Cadmium batteries are utilized for applications where the battery is the only source of energy in the equipment. One such application is a digital radio telemetry system for recording seismic data. In this application remote units are powered by rechargeable Nickel-Cadmium battery packs, which can power a remote unit for about 72 hours of normal use. Typically, the battery packs in the remote units are either removed after a period of use and replaced with fully charged packs, or are recharged while in place in the remote unit from a portable source which can supply either AC or DC power suitable for recharging the Nickel-Cadmium battery packs. In any event maintaining the seismic recording system requires safely recharging the Nickel-Cadmium battery packs from whatever the level of discharge of the battery, including a deep discharge, to a full charge in 8 hours or less.

Rapid charging of Nickel-Cadmium batteries involves problems relating to both thermal conditions and voltage conditions. One noteworthy problem is the gassing of the battery, wherein oxygen produced by the charging reaction builds up pressure that can exceed limits of the case, at which time venting of the battery would occur. This gassing condition is temperature dependent. In a battery which is less than about 60 percent fully charged and at or above room temperature, 25 degrees C., the oxygen produced by the charging reaction chemically recombines thereby preventing the buildup of pressure. Below room temperature the oxygen does not recombine as readily thereby allowing pressure to build up. Consequently, it is desirable to decrease the charge rate as the temperature drops, or as the battery becomes fully charged.

Another temperature dependent condition is the efficiency of the charger. The charging efficiency may be defined as the ratio of the output of a battery to the input required to restore the capacity. As the temperature increases the charging efficiency decreases.

Voltage dependent conditions occur when applying constant current to a Nickel-Cadmium battery. For example, in applying a 5-hour rate constant current to a fully discharged cell, the cell voltage increases slowly to about 1.4 volts in about 4 hours, after which it rapidly increases to about 1.6 volts where it remains until the charge is finished.

Because of the notoriety of these problems, many circuits have been proposed for generating a reference voltage which varies in a manner to produce an effective charge rate for a Nickel-Cadmium battery. Generally, the type of charging system proposed requires that there be some form of transfer from a high charge rate to a low charge rate in response to voltage and/or temperature sensing. In addition, the operation of the charging circuit is typically based on compensating the charging circuit to match the temperature characteristics of an ideal Nickel-Cadmium battery.

The type of battery chargers described above are deficient for charging a battery having a malfunction or cell damage such as a short circuit between cell plates. Damage to the battery may result from the use of these chargers because the critical voltage to be sensed which would transfer the high level operation to a low level operation may be at a higher voltage level than can be achieved with a damaged cell.

It is thus an object of this invention to provide a method and apparatus for charging a temperature sensitive battery at a constant voltage and with current limiting. It is another object of this invention to provide a reference voltage which varies with the temperature of the battery, and is representative of a safe and efficient voltage that a constant voltage type charger could apply to a Nickel-Cadium battery. Still another object of this invention is to provide method and apparatus for detecting cell damage such as a short circuit between plates.

SUMMARY OF THE INVENTION

In accordance with the invention, apparatus and method are provided for charging a battery in a rapid manner without damage to the battery. A battery charging circuit comprises a serial arrangement of an unregulated power source, a switching type voltage regulator and a battery to be charged. A controller is provided for the voltage regulator. The controller responds to external voltage signals, and provides signals to the voltage regulator that switch on and off the flow of charging current to the battery. The switching occurs in such a manner that the output voltage of the regulator is maintained at a desired value, or the current delivered to the battery is limited at a desired value.

The external voltage signals provided to the controller are: (1) a signal representative of the actual charging current supplied to the battery, and (2) a temperature compensated voltage signal (TCVS) representative of the voltage that a constant voltage type charger could safely apply to a partially charged (about 50 percent or more) Nickel-Cadmium battery at the existing temperature of the battery.

The TCVS is generated by a modified resistive voltage divider network connected across the battery terminals comprising a combination of temperature stable resistors and a thermistor. The thermistor is positioned in the case of the battery to respond to battery temperature, and is connected in parallel with one of the temperature stable resistors of the voltage divider network. It has been found that by modifying a resistive voltage divider to include the thermistor in parallel with one of the resistors, it is possible, with proper selection of component values for the resistors and thermistor, to cause an output of the voltage divider network to correspond to voltage/temperature charging characteristics that are known to provide efficient charging conditions for the battery. Thus a safe, efficient constant charging voltage for a partially discharged temperature sensitive battery such as a Nickel-Cadium battery can be experimentally determined at a plurality of temperatures and a graph of voltage vs temperature for the battery can be produced. With proper selection of ohmic values for the resistors and thermistor, the output of the modified voltage divider can be made to closely represent the experimentally determined voltage that provides safe, efficient charging of the battery at the existing temperature of the battery.

The above described signals are utilized to control a charging program for the battery in which the current and voltage of a charger are sequentially varied over time in order to rapidly and safely place the battery in a state of full charge.

DETAILED DESCRIPTION OF PREFERRED EMBODIMENT

Other objects and advantages of the invention will be apparent from the foregoing brief description of the invention and the claims as well as the detailed description of this invention and the drawings in which:

Figure 1:
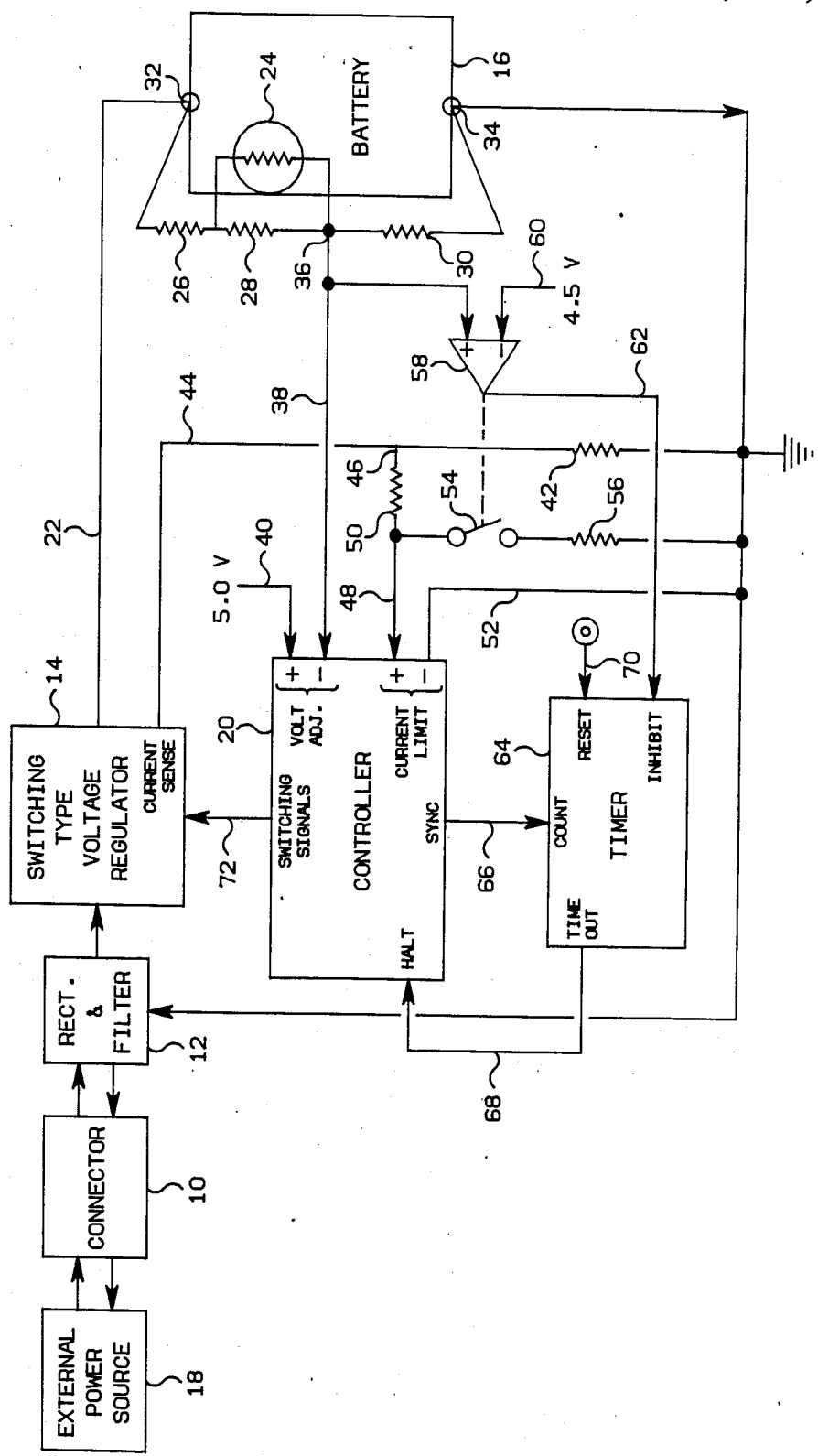
FIG. 1 is a simplified diagrammatic illustration of a battery charger of this invention.
Figure 4:
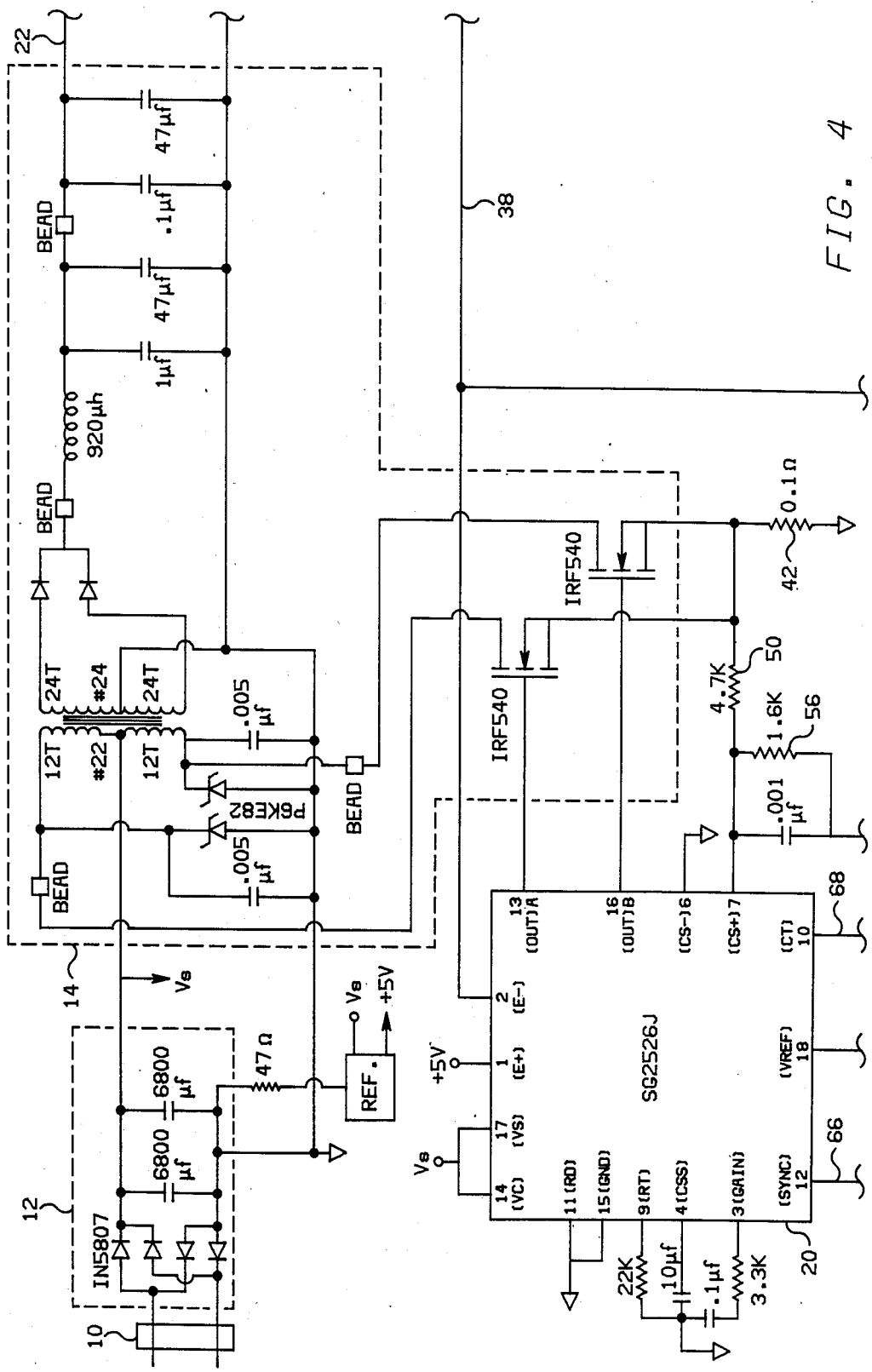
Figure 5:
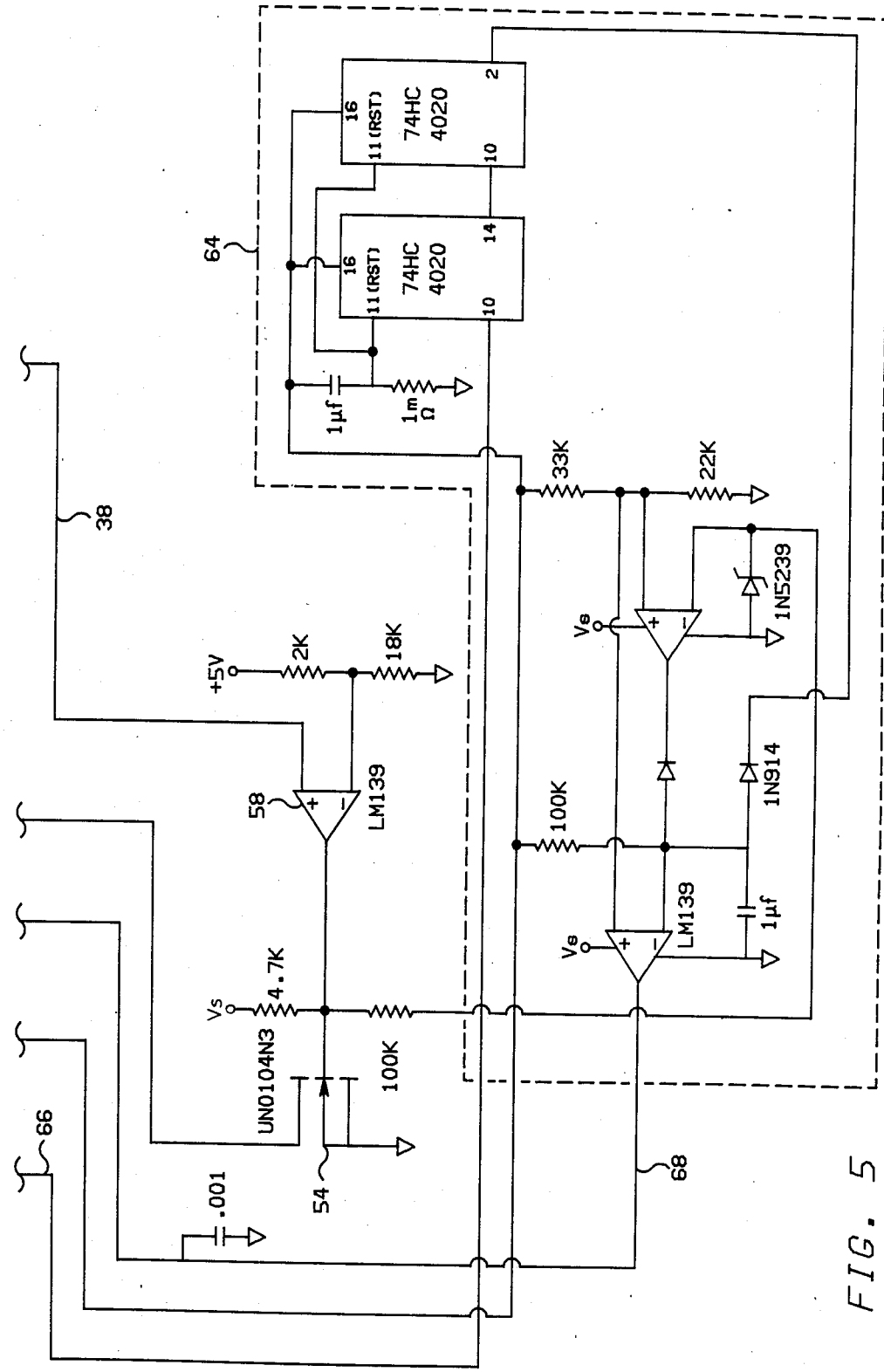
Figure 6:
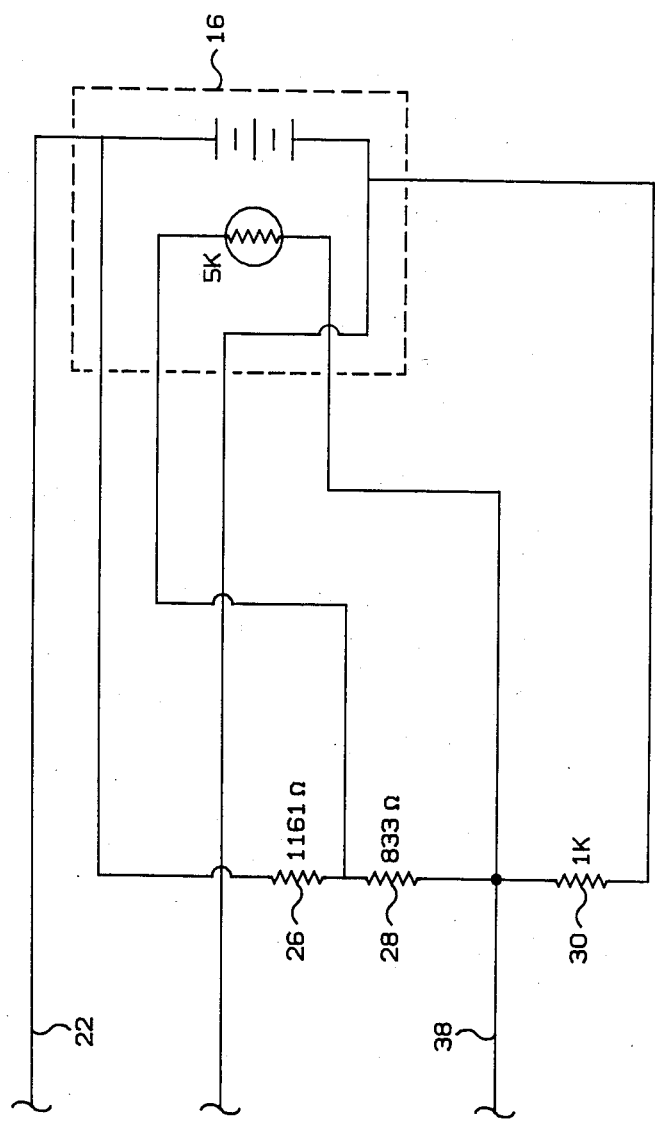

FIGS. 4, 5 and 6 taken together is a schematic diagram of a practical electronic circuit of a battery charger which can be utilized to perform the functions illustrated in FIG. 1.

This invention is described in terms of specific electronic components and specific batteries to be charged. However, the invention is applicable to different electronic circuit configurations and different types of temperature sensitive batteries.

Referring now to the drawings and in particular to FIG. 1, there is illustrated a rectifier and filter 12, a switching type voltage regulator 14, and a battery 16 connected in series to form a path for the charging current for the battery 16. A power connector 10 conductively connects an external source of power 18 to the rectifier and filter 12 to supply power to the rectifier and filter 12. The power supplied to the rectifier and filter 12 through power connector 10 can be either AC or DC e.g. 10–30 VDC or 10–22 VAC for charging a 10 cell Nickel-Cadmium battery. The power connector 10 may be any connector device selected by the user which is capable of transmitting the current and voltages associated with the battery of the particular application.

The switching type voltage regulator 14 is conductively connected to receive direct current power from rectifier and filter 12. The regulator 14 is also conductively connected to controller 20 to receive switching signals from controller 20 which cause the regulator 14 to maintain a desired voltage on regulator output line 22 or alternatively to limit the current supplied to battery 16.

A temperature sensing device such as a thermistor 24 is disposed in the battery 16 to sense the temperature of battery 16. Preferably temperature stable resistors 26, 28 and 30 are connected in series across the battery terminal 32 and 34. Thermistor 24 is connected in parallel with resistor 28. Thus the combination of resistors 26, 28 and 30 along with thermistor 24 form a modified resistive voltage divider network connected across battery terminals 32 and 34.

Figure 2:
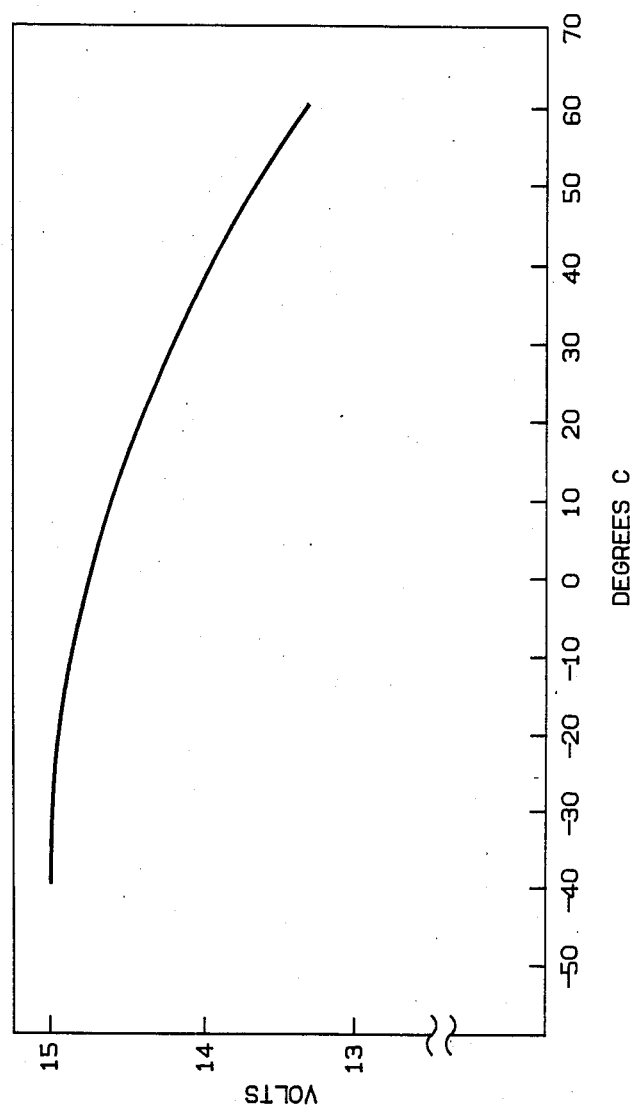
FIG. 2 is a graphical illustration of a safe, efficient voltage as a function of temperature that could be applied to a 10-cell Nickel-Cadmium battery.

Actual values for the resistors 26, 28 and 30 and thermistor 24 of the modified voltage divider network that will provide an output signal for achieving the voltage/temperature conditions as illustrated in FIG. 2 can be determined experimentally. If desired a computer program can be written to aid in determination of these component values. As a further enhancement, a computer program can be written to determine component values for the modified voltage divider network wherein the voltage temperature characteristic of the divider network plots as a segment of a circle and wherein the segment passes through the experimentally determined points that provide safe charging at the existing temperature of the battery.

An output for the modified voltage divider is taken at node 36 as a voltage signal 38, signal 38 being a temperature compensated voltage signal by virtue of responding to thermistor 24 and the voltage across battery terminal 32 and 34. Signal 38 is provided as an external voltage input signal to controller 20 for utilization by a voltage adjust circuit in controller 20 as will be explained more fully hereinafter. A constant 5 volt reference signal 40 is also provided to controller 20 for utilization by the voltage adjust circuit.

Resistor 42 is a current sense resistor, connected between the voltage regulator 14 and ground. Resistor 42 is a low value resistor typically about 0.1 ohm, and receives a current via line 44 proportional to the charging current supplied from the voltage regulator 14 to the battery 16 via regulator output line 22. The voltage developed across resistor 42 is utilized as a external voltage signal 48 representative of the actual charging current supplied to battery 16 and is provided through line 46 and resistor 50 as an input to controller 20. Signal 48 is utilized by a current limit circuit of controller 20 as will be described more fully hereinafter. A ground reference signal 52 is also provided to controller 20 for utilization by the current limit circuit. A switch 54 and resistor 56 are connected in series from line 48 to ground such that operation of switch 54 causes an abrupt change in signal 48.

Signal 38, the TCVS is also provided to the positive input of a comparator 58 which compares TCVS signal 38 with a 4.5 volt reference signal 60. The output of comparator 58 is operatively connected to switch 54. The output of comparator 58 is also utilized for inhibit signal 62 which is provided from comparator 58 as an input to timer 64.

Timer 64, which is a resettable binary counter, is provided with a clock signal 66 from controller 20. The clock signal 66 is provided from the sync output of controller 20 to the count input of timer 64. A timeout period for timer 64 is set to a desired time by selecting an appropriate output count for activating the time out signal 68. In operation, timer 64 is reset to 0 via a reset signal 70 which can be a signal from an external source, or a power up reset signal. Timer 64 counts a specified number of pulses provided from controller 20 and activates the time out signal 68 on reaching the specified count. Signal 68 is provided from counter 64 to the halt input of controller 20. The time out signal 68 provides an indication to controller 20 that the voltage of the battery being charged has not reached a value of about 90 percent of TCVS during the timing period, typically 40 minutes, determined by timer 64. In the event time out signal 68 is activated charging of the battery is halted, to prevent possible further damage to a battery having a short circuit between cell plates.

As indicated in FIG. 1, the controller 20 is comprised of several circuits including a voltage adjust circuit, a current limit circuit, an oscillator circuit which produces a logic clock signal for synchronization purposes, a remote shutdown or halt circuit, and an output driver circuit for providing the switching signals to regulator 14. As previously mentioned, the controller 20 provides an output in response to appropriate voltage signals fed back to the controller 20 from external sources. The voltage adjust circuit of controller 20 responds to signals 38 and 40, by modulating the pulse width of the switching signal 72 in such a manner to reduce the difference between signals 38 and 40 to zero. For a particular controller which can be utilized in the present invention, the feedback signal is a dc voltage level between 0-5 volts. Thus, a constant 5-volt potential for signal 40 provides for maximum modulation of switching signals 72 in response to signal 38.

The controller 20 will provide switching signals 72 that will cause the voltage at node 36 to equal the reference signal 40. The voltage at node 36 corresponds to a proportionally higher voltage across battery terminal 32 and 34. However, if the switching signals required by the voltage adjust circuit to maintain a desired voltage at node 36 cause the charging current to exceed the limiting value determined by signal 48, control of pulse width modulation of switching signal 72 is automatically transferred to the current limit circuit of controller 20. Essentially, the controller 20 responds to two external voltage signals, one being a limiting valve for the battery charging current as represented by signal 48, and the other signal being a TCVS as represented by signal 38. Controller 20 thus maintains constant either the desired charging current as represented by signal 48 or the desired battery voltage as represented by signal 38.

A suitable controller which can be utilized in the circuit illustrated in FIG. 1 is an SG2526J, Regulating Pulse Width Modulator, commercially available from Unitrode Corporation, Lexington, Mass.

The switching type voltage regulator can be any convential switching regulator which accepts a dc input voltage from a power source and switching signals from a controller, and provides a regulated output voltage despite variation in the input voltage and variations in the load on the regulator. Generally, switching type regulators regulate the output voltage by varying the duty cycle of power transistor switches.

In a specific and presently preferred embodiment of this invention as illustrated in FIG. 4, the switching type voltage regulator comprises a pair of N-channel mosfets for switching the primary winding of a split winding step up power transformer. D.C. power is received at the center of the primary winding of the power transformer, and a dc output is delivered from a conventional full wave rectifier and filter connected to the secondary of the power transformer. As illustrated in FIG. 6, the output of the voltage regulator 14 is connected to the battery 16.

A charging program in which the current or the voltage applied to a fully discharged Nickel-Cadium battery is sequentially varied over time can be implemented with the charger circuit illustrated in FIG. 1. Several charging modes are known including (1) constant current, (2) constant voltage, (3) pulse current, (4) trickle current, and (5) various charge rates such as a 5-hour rate (C5) in which full capacity of the battery is restored in 5 hours.

As has been previously stated, in some applications, it is desirable that a battery be restored to a fully charged state within a specific time period after full or partial discharge without endangering the battery. Rapid recharging or excessive overcharging of the battery can result in the evolution of substantial amounts of undesirable gases. Further, rapid recharging or excessive overcharging can overheat the battery to the point at which thermal runaway will occur. Generally speaking rapid recharging or excessive overcharging seriously degrades the useful life of the battery.

A successful charging program must recognize and be responsive to practical characteristics of the battery to be charged. The battery charger of this invention provides a charging program that is automatically responsive to the state of discharge of the battery and simultaneously prevents application of a high charge rate to a battery having a shorted cell. Further, an efficient charge rate is provided for the degree of discharge of the battery and the temperature of the battery.

Figure 3:
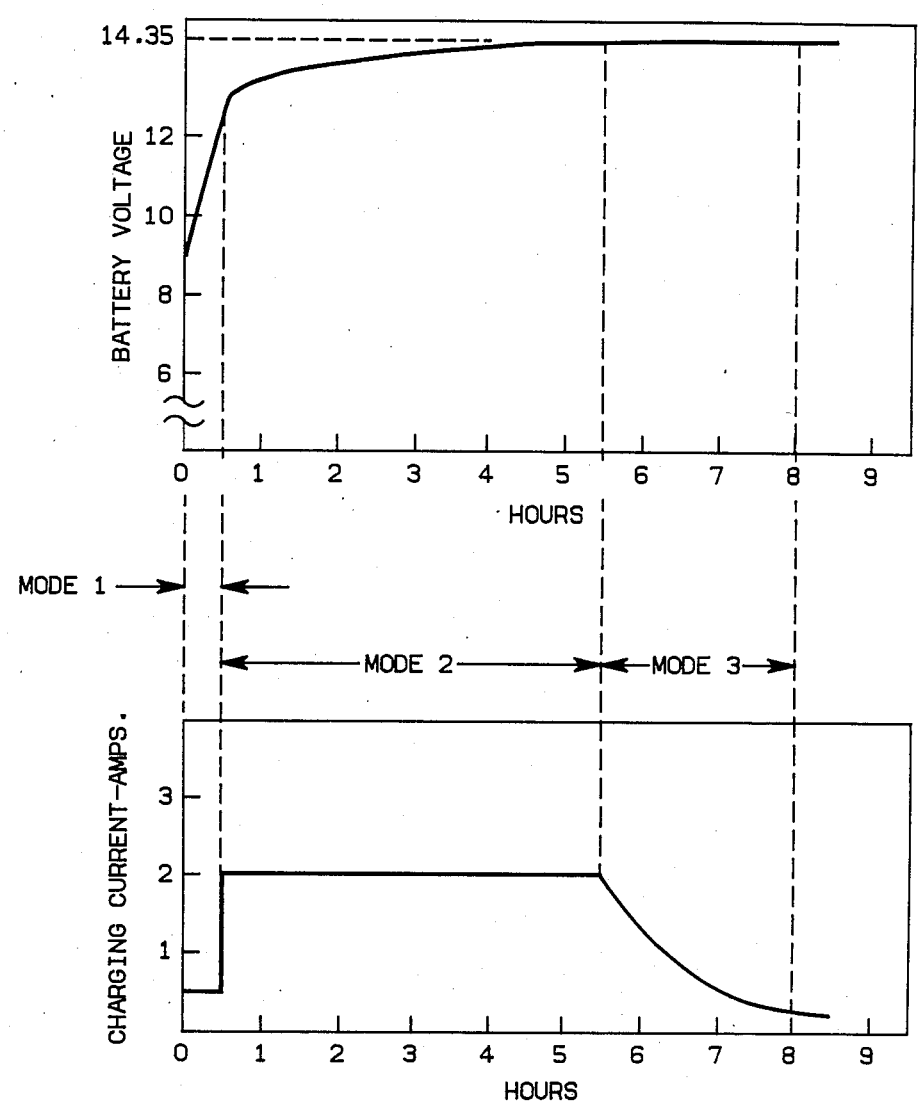
FIG. 3 is a graphical illustration of charging current and battery voltage for three sequential charging modes for a 10-cell, 10-ampere hour Nickel-Cadium battery.

In the first mode as illustrated in FIG. 3, a constant charging current applied to the battery 16 is limited by signal 48 of controller 20 to 0.5 amperes. The constant current of 0.5 amperes, which is a C/20 rate, is maintained until the TCVS 38 attains a value of 4.5 volts. The C20 rate, which can be considered a trickle rate, can be maintained even with some damaged cells for extended periods without further damage to the battery. A predetermined period of time is allowed by timer 64 for the TCVS 38 to attain 4.5 volts as represented by signal 60.

Signal 60 is representative of the minimum voltage that a 10-cell Nickel-Cadmium battery should attain with a C/20 charge rate maintained for 40 minuted. Stated another way, signal 60 is representative of a voltage that a 10-cell Nickel-Cadmium battery could not attain without overcharging if the battery has at least one shorted cell. This mode is provided for the purpose of detecting batteries having shorted cells.

The first mode is typically initiated by a power up signal applied to timer 64, and is normally terminated by comparator 58 operating switch 54 when the TCVS 38 attains 90 percent of its desired value. Thus, the length of time that the first mode remains in effect can range from a few seconds to 40 minutes depending on the condition of the battery being charged.

In the second mode as illustrated in FIG. 3, a second constant current mode is entered in which a constant current of two amperes is supplied to the battery 16. Mode 2 is generally the main charging mode for charging the battery 16, since this mode is maintained while the battery state of charge is between about 20 percent and about 95 percent of the battery's fully charged capacity. It is noted that the 2-ampere current supplied to the battery 16 during the constant current charging of mode 2 represents a C/5 charge rate which charge rate would fully charge the battery 16 in 5 hours. Thus, mode 2 is maintained for a length of time dependent on the initial state of discharge of the battery 16.

Mode 2 is terminated when the TCVS 38 attains a value of 5 volts a provided by signal 40. Signal 40 is representative of the voltage across battery terminals 32-34 that provides the desired voltage illustrated in FIG. 2 across battery terminals 32-34 for the existing temperature of the battery. Thus for any temperature between −20° C. and +50° C., a temperature compensated voltage as illustrated in FIG. 2 can be provided for charging battery 16 in a constant voltage charging mode.

In the third mode, which is a constant voltage mode, the voltage as depicted in FIG. 2 and as representative of signal 38 is applied to battery 16. The battery 16 is nearly fully charged at the beginning of mode 3 and with the constant voltage applied between the battery terminals 32 and 34, the charge current can vary in accordance with the battery demand.

As an example for charging a 10-cell, 10 AH Nickel-Cadmium battery at room temperature, a charging program as illustrated in FIG. 3 comprises three charging modes, each mode related to the initial state of the battery or the amount of charge to be delivered to the battery.

In mode 1 the battery voltage rises rapidly from some state of discharge, which may be effectively dead and may have cell damage. In the 10-cell Nickel-Cadmium battery under discussion an average cell voltage would be less than 1.0 volt d.c. for a battery terminal voltage of for example 9 volts.

Controller 20 delivers switching signals to regulator 14 to provide charging current to the battery as limited to a C/20 rate by signal 48. At room temperature the battery voltage rises rapidly in response the the C/20 charge rate to about 1.29 volts/cell or 12.9 volts for the battery terminals in 40 minutes or less, depending on the initial state of the battery.

When the TCVS 38 is 4.5 volts at 25° C. a corresponding battery voltage is 12.9 volts which is 90 percent of the 14.35 volts indicated on FIG. 2 for safe efficient charging at 25° C. On attaining a value of 4.5 volts for TCVS signal 38, mode 1 is terminated.

In mode 2 comparator 58 changes state and manipulates signal 48 to require a C/5 charge rate. During mode 2 the battery voltage rises slowly from 12.9 to 14.35 volts in about 4-5 hours in response to the C/5 charge rate. Mode 2 is terminated when the TCVS signal 38 attains a value of 5 volts. In mode 3 control of switching signals 72 is transferred from the current limit circuit to the voltage adjust circuit of controller 20. At 25° C. controller 20 provides switching signals to regulator 14 to maintain a constant 14.35 volts across battery terminals 32 and 34. As indicated in FIG. 3, the charging current in mode 3 which is allowed to vary as the battery 16 demands, decays rather rapidly since the battery is essentially fully charged at the end of mode 2.

FIGS. 4, 5 and 6 taken together illustrate a circuit including specification of the values for capacitors, inductors and resistors, which may be utilized to implement the functions illustrated in FIG. 1. The circuit is preferably implemented utilizing a combination of linear integrated circuits and digital integrated circuits along with discrete components such as diodes, MOSFET transistors and a transformer in addition to resistors and capacitors. The integrated circuits illustrated in FIGS. 4, 5 and 6 may be obtained from a number of suppliers. The function of each of these integrated circuits is fully described by the manufacturer of these integrated circuits and the manner in which the circuit operates would be obvious to one skilled in the art of electronics.

Power supplies and other conventional circuitry required by the various integrated circuits have not been fully illustrated in FIGS. 4, 5 and 6 for the sake of simplicity. Again, such power supplies and additional circuitry are specified by the manufacturers and are well known to those skilled in the art of electronics.

The invention has been illustrated and described in terms of a preferred embodiment as illustrated in FIGS. 1-6. As has been previously discussed, reasonable variations and modifications are possible by those skilled in the art within the scope of the disclosure and the appended claims.

That which is claimed is:

1. Apparatus for charging a battery comprising:

a switching type voltage regulator having a current sense output wherein said regulator is connected in a series circuit between a power source and a first terminal of said battery, said regulator receiving unregulated dc power from said power source and delivering regulated power to said first terminal of said battery;

a controller for said regulator operatively connected to provide switching signals to said regulator, said controller having a voltage adjust circuit and a current limit circuit, and having a first external voltage input and a first reference voltage input associated with said current limit circuit, and having a second external voltage input and a second reference voltage input associated with said voltage adjust circuit, said voltage adjust circuit and said current limit circuit being operatively connected to modulate said switching signals in response to the potential applied to said first and second external voltage inputs;

a current sense resistor having a first terminal connected to said current sense output of said regulator and a second terminal connected to a second terminal of said battery;

means for connecting a current sense output voltage from said regulator to said first external voltage input of said controller for modulating said switching signals in response to said current sense output voltage;

a resistive voltage divider network connected across said first and second terminals of said battery;

a thermistor disposed to measure the temperature of said battery, wherein said thermistor is connected in parallel with a resistor of said resistive voltage divider network;

means for operatively connecting a node of said resistive voltage divider network to said second external voltage input of said controller for modulating said switching signals in response to said thermistor and the voltage of said battery;

means for connecting a ground potential to said first reference voltage input; and means for connecting a reference potential to said second reference voltage input wherein said reference potential corresponds to the maximum modulation of said switching signals that can be provided by said controller.

2. Apparatus in accordance with claim 1 additionally comprising:

a timer for generating a time out signal, said timer having a counting circuit for counting synchronization pulses received from said controller and having an inhibit circuit with an associated input, and having an output associated with said time out signal;

a comparator having two inputs and an output, a first input of which is connected to said node of said voltage divider network and a second input of which is connected to a fixed reference voltage;

means for connecting said comparator output to said input associated with said inhibit circuit of said timer;

a halt circuit associated with said controller;

means for connecting said output of said timer to said halt circuit of said controller wherein charging of said battery is halted if said time out signal is present.

3. Apparatus in accordance with claim 2 wherein said means for connecting a current sense output voltage from said regulator to said first external voltage input of said controller comprises:

a first resistor connected between said first terminal of said current sense resistor and said first external voltage input of said controller;

a second resistor connected between said first external voltage input of said controller and said second terminal of said current sense resistor.

switch means having a circuit path for connect/disconnect switching of said second resistor and said first external voltage input of said controller; and means for connecting said output of said comparator to said switch means, wherein said second resistor is disconnected when the voltage at said first input of said comparator is less than the voltage at said second input of said comparator.

4. Apparatus in accordance with claim 3, additionally comprising:

power rectifier and filter means serially connected between said power source and said switching regulator for rectifying ac power received from said power source and for passing unregulated dc power received from said power source to said regulator, and power connector means for removable connection between said power source and said power rectifier and filter.

5. A method of charging a temperature sensitive battery without damage to the battery comprising the following sequential steps:

(a) generating a temperature compensated voltage signal representative of a voltage for safely charging said battery at the exisitng temperature of said battery;

(b) supplying a constant current having a first magnitude to said battery until said temperature compensated voltage signal attains a first predetermined voltage level representative of the minimum voltage that said battery should attain within a predefined time period in response to said constant current having said first magnitude if said battery is undamaged;

(c) supplying a constant current having a second magnitude which is greater than said first magnitude to said battery, said second magnitude of constant current being applied to the battery until said temperature compensated voltage signal attains a second predetermined level representative of a predetermined voltage which can be applied across the terminals of said battery for safely and efficiently charging said battery at the existing temperature of said battery; said second predetermined voltage level being higher than said first predetermined voltage level; and (d) impressing a constant voltage across the terminals of said battery, said constant voltage corresponding to the voltage attained by said temperature compensated voltage signal in step.

6. A method in accordance with claim 5 wherein said step of generating a temperature compensated voltage signal comprises the steps of:

modifying a resistive voltage divider network comprising three resistors in series, by connecting a thermistor in parallel with the central one of the resistors of said resistive voltage divider network to provide a modified voltage divider network;

selecting ohmic values for the resistors and thermistor of said modified resistive voltage divider network that will provide an output from the modified voltage divider network that varies with temperature and voltage of the battery in a manner that corresponds to a predetermined voltage vs. temperature charging characteristics of the battery; and connecting the resistive elements of said modified voltage divides network across the terminals of the battery and disposing the thermistor in the case of the battery, such that said temperature compensated voltage signal is generated at said output of said modified voltage divider network.

7. A method in accordance with claim 6 additionally comprising the steps of:

initializing a time period on starting supply of said constant current having a first magnitude to said battery in step, said time period being sufficiently long to allow said temperature compensated voltage signal for an undamaged but fully discharged battery to attain the first predetermined level required in step; and activating a time out signal at the end of said time period wherein said time out signal stops flow of charging current to said battery;

inhibiting said time out signal if said temperature compensated voltage signal attains said first predetermined level in step.

* * * * *

UNITED STATES PATENT AND TRADEMARK OFFICE
CERTIFICATE OF CORRECTION

PATENT NO. : 4,667,143

DATED : May 19, 1987

INVENTOR(S) : Craig L. Cooper

It is certified that error appears in the above-identified patent and that said Letters Patent is hereby corrected as shown below:

```
Claim 5, column 10, line 11, insert ---(c)--- after the word step.
Claim 7, column 10, line 38, insert ---(b)--- after the word step.
Claim 7, column 10, line 42, insert ---(b)--- after the word step.
Claim 7, column 10, line 48, insert ---(b)--- after the word step.
```

Signed and Sealed this

Third Day of November, 1987

*Attest:*

DONALD J. QUIGG

*Attesting Officer*      *Commissioner of Patents and Trademarks*